April 17, 1962     J. DIMATTEO     3,029,544
WATER-WEIGHTED FISHING LINE CASTER
Filed Feb. 8, 1961
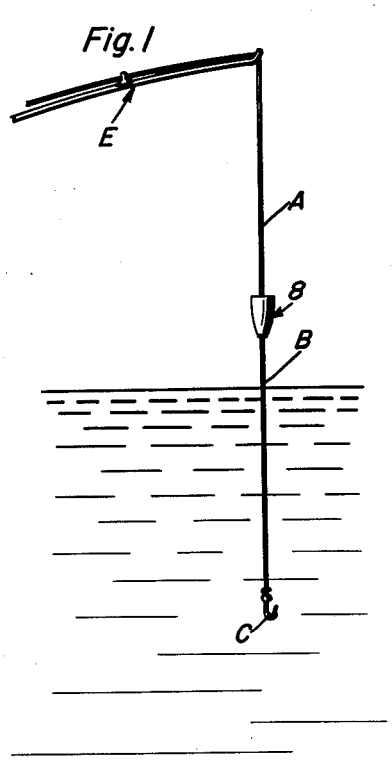
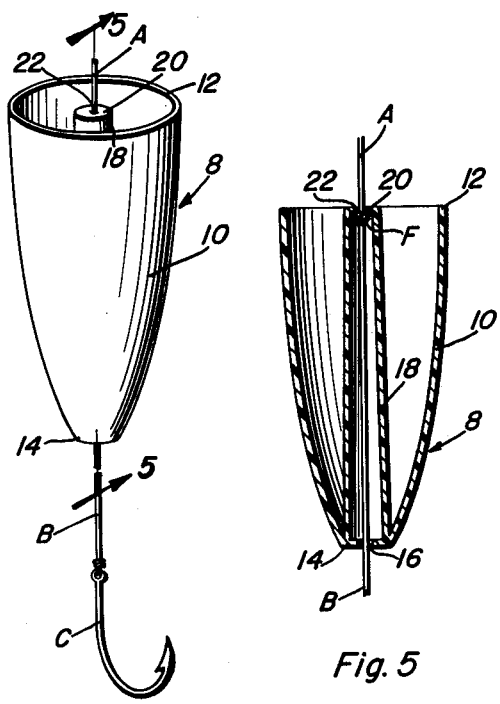
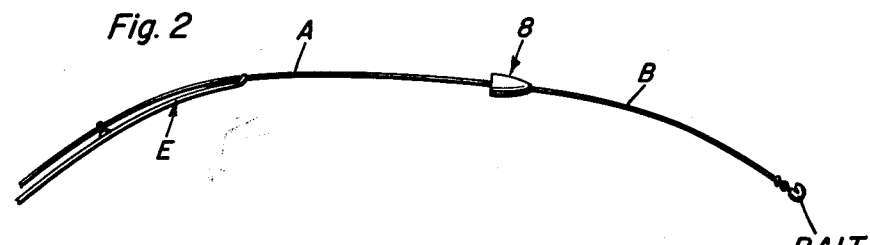
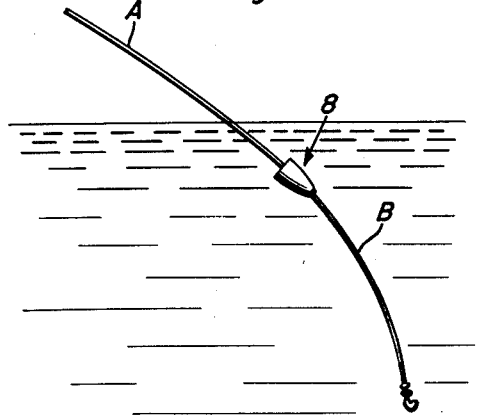
Joseph Dimatteo
INVENTOR.
BY *[signature]*
*Attorneys*

3,029,544
WATER-WEIGHTED FISHING LINE CASTER
Joseph Dimatteo, 7916 E. Firestone Blvd., Downey, Calif.
Filed Feb. 8, 1961, Ser. No. 87,791
3 Claims. (Cl. 43—44.9)

This invention relates to line-attached devices in general but pertains, more explicitly, to an improved fishing line caster which is suitably and appropriately constructed to direct and facilitate casting a fishing line, some thirty to fifty yards more or less from the side of a boat or pier, into the water which is being fished.

As is well known a fisherman when fishing from a sport fishing boat, perhaps from a pier too, is often hampered in freedom of activity because of crowded surroundings. Not only is the safety factor involved, line tangling between adjacent lines results in exasperating situations and calls for restraint which are not only unpleasant but try the patience and skills of all concerned. With a view toward alleviating the trials and tribulations of short-tempered anglers many casting aids have been tried by inventors in this field of endeavor but apparently have not met with widespread approval and use; so, it follows that the instant endeavor has to do with a simple, practical and efficient caster which, it is believed, may solve the overall problem. To these ends the herein disclosed caster is offered for use.

In carrying out the principles of the instant concept a simple and expedient hollow cup is used. This cup provides a receptacle or container and is charged with water with the result that a desired degree of heaviness is had. It follows that the cup thus loaded with water and mounted on the line becomes a directing and casting weight. The live bait, generally used, and hooked to the free end of the line does not have to cope with a drag on the line inasmuch as the line is freely slidable through a passage provided therefor in the water-weighted cup. It follows that the life of the bait is noticeably extended. Also, when a strike is had the free line, unhampered by the weighted cup, enables the fisherman to maintain the desired feel and to play the potential catch accordingly.

Briefly, a preferred embodiment of the invention is characterized by a line caster in the form of a hollow elongated cup which is light in weight and has a substantially closed leading end and a wholly open trailing end. This cup is designed and adapted to be charged with a limited supply of water, that is prior to initiating the intended cast. The cup has a lengthwise axially centered line passage through which the fishing line passes and, in fact, slides relative to the cup and passage. The cup when thus loaded is adapted to enter and completely submerge itself in the water which is being fished.

By preference the cup is made of moldable transparent plastic material and is shaped to represent or provide a truncated smooth-surfaced cone. The line passage is defined by an axially disposed line accommodating tube the lower end of which is integral with the truncated bottom portion of the cup or receptacle. This tube is preferably commensurate in length with the length of the cup and has a turned in centrally apertured flange at the top, which flange constitutes a check shoulder for cooperation with a knot or an equivalent stop shoulder on the fishing line. This construction and arrangement restricts the upward sliding movement of the line relative to the tube or conversely, regulates the distance between the caster and the sinker-equipped live baited hook on the line's leader.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view on a small scale showing a portion of the line suspended vertically, for illustration only, from the end of a rod and showing the novel caster and the manner in which it is associated with the line;

FIGURE 2 is a view in side elevation which shows the manner in which the cast is accomplished;

FIGURE 3 is a similar view, with the rod omitted, showing the caster submerged in the water being fished;

FIGURE 4 is an enlarged view through a perspective and showing, with greater particularity, the construction of the improved line caster; and, FIGURE 5 is a section on the vertical line 5—5 of FIGURE 4, looking in the direction of the arrows.

In FIGURES 1 to 3 the fishing line is denoted at A, the line's leader at B, and the fishing hook at C. In FIGURES 1 and 2 the reference letter E designates a suitable fishing rod or pole as the case may be. It should be noted in FIGURE 5 that the line or leader is provided with a knot F which constitutes the aforementioned stop shoulder on the line.

The invention itself comprises the aforementioned water-weighted fishing line caster and this is denoted as an entity by the numeral 8. It is preferably in the form of an elongated truncated conical cup or shell 10. In fact it is preferred that this cup be molded from a suitable grade of commercial plastics which is transparent. The upper open end of the cup which may be also called the trailing end is denoted at 12 and the substantially closed bottom or leading end is denoted at 14 (FIG. 5). It will be noted that this end 14 is substantially closed except for a line opening or hole 16. Formed integral and centrally and axially arranged in the receptacle portion of the cup is the correspondingly elongated tube 18 which defines a line passage. The lower end of the tube is integral with the apertured bottom 14 as shown in FIG. 5. The tube is of a length corresponding with the length of the cup and the upper end of the tube has a turned in flange 20 with a central line opening 22. This flange constitutes a check shoulder and cooperates with the stop shoulder F. The cup including the line passage or tube is extremely light in weight and in fact weighs approximately $5/16$ of an ounce.

As previously touched upon, this unique line attachment is not a float in the strict sense of the term. It is a loadable line caster. Practice has shown that the live bait which is hooked to the extremity of the line cannot exert a drag or pull against the device itself. The line is free to slide through the passage of the cup and will extend the life of the bait over a prolonged period of time. This is to say that when the line is cast out any pressure that might otherwise be set up or exerted is not transferred to the living bait.

Certain theories of operation in respect to the behavior of the device when it descends into the water have been taken into account but need not, it is believed, be expounded or touched upon here inasmuch as the essence of the invention has to do with the particular construction of the loadable aspect of the cup, said cup serving to guide and direct the line of flight of the leader-equipped end of the fishing line. In practice it may be said that all that is necessary is to load the cup preparatory to making the cast with the desired amount of water and to make the cast in the usual way. During the course of flight of the line the loaded cup provides the directional weight needed and facilitates handling the line and making the cast with safety even under crowded surroundings. The stop shoulder F on the line is beneath the check shoulder 20 which means that the downwardmost position of the device on the line is approximately that illustrated in the accompanying views of the drawing. In practice the hole 16 at the bottom may be sufficiently large to allow, if desired, the knot or shoulder F to pass therethrough.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in facilitating the step of expeditiously casting a baited sinker-equipped fishing line held and controlled by a fisherman, a line caster comprising a hollow elongated cup made of transparent plastic material and shaped to provide a smooth-surfaced truncated cone, extremely light in weight, the truncated lower end of said cone being substantially closed, the upper end open and defining a receptacle portion adapted to be charged and thus weighted to a desired degree with water prior to initiating an intended cast of said cup, said cup being provided interiorly with an axially disposed member commensurate in length with the length of said receptacle portion and having a passage through which a fishing line is adapted to pass, the upper and lower ends of said member having stop shoulders, said stop shoulders having line holes restricted in size relative to the cross-sectional dimension of the passage but proportional with the cross-section of the line whereby a fishing line may be slidingly threaded through said restricted line holes and the intervening passage, and wherein a stop shoulder provided on said line may be caused to abut said stop shoulders, said cup being adapted to enter and completely submerge itself in the water which is being fished.

2. In combination, a fishing line caster comprising an elongated rigid hollow cup made of transparent plastic material, said cup being truncated conical in elevation, the truncated lower end constituting a leading end and being planar and having a restricted line hole positioned therein defining a lower stop shoulder, the trailing upper end of said cup being wholly open, a hollow tube positioned axially in the receptacle portion of the cup, said tube being commensurate in length with the length of the cup and providing a line passage in communication with said line hole, said tube having a cross-section corresponding to the diameter of the truncated end of the cup and being integrated with the interior surface of the truncated end, said tube being of cross-sectional dimension less than the cross-section dimension of the cup, the upper end of the tube which is flush with the upper trailing end of the cup being wholly free of positive connection with the walls of the cup with the result that the space between the walls of the cup and walls of the tube is free of obstruction, the upper end of said tube having a flange with an axially disposed restricted hole defining an upper stop shoulder therein in alignment with the hole at the lower leading end of the cup, and a fishing line having a portion thereof passing slidingly through the restricted openings and passage defined by said tube, said fishing line having a stop shoulder and said flange constituting a stop shoulder with which the stop shoulder on the line is engageable.

3. In combination, a fishing line caster comprising an elongated rigid hollow cup, said cup being truncated conical in elevation and having a truncated lower end constituting a leading end defining a stop shoulder, a hollow tube positioned axially in the receptacle portion of the cup, said tube being commensurate in length with the length of the cup and providing a line passage in communication with said line hole, said tube being integrated at a lower end thereof with the interior surface of said truncated end, said tube being of a cross-sectional dimension less than the cross-sectional dimension of said cup, the upper end of said tube being flush with the upper trailing end of the cup and being wholly free of positive connection with the circumscribing walls of the cup, the space between the walls of the cup and cooperating walls of the tube being unobstructedly open, the upper end of said tube having a flange defining a stop shoulder, said flange having a restricted line passing hole therein in alignment with the hole at the lower leading end of the cup, said passage and the restricted holes at the upper and lower ends thereof being adapted to permit the passage of a fishing line therethrough.

References Cited in the file of this patent

UNITED STATES PATENTS

| | | |
|---|---|---|
| 446,377 | Burr | Feb. 10, 1891 |
| 779,744 | Shakespeare | Jan. 10, 1905 |
| 1,128,205 | White | Feb. 9, 1915 |
| 2,014,517 | Beregow | Sept. 17, 1935 |
| 2,260,705 | Eguchi | Oct. 28, 1941 |
| 2,651,136 | Kruze | Sept. 8, 1953 |
| 2,793,447 | King | May 28, 1957 |
| 2,840,945 | Sealock | July 1, 1958 |
| 2,908,989 | Povinelli et al. | Oct. 20, 1959 |
| 2,960,055 | Tomek | Nov. 15, 1960 |

FOREIGN PATENTS

| | | |
|---|---|---|
| 764,398 | Great Britain | Dec. 28, 1956 |
| 793,075 | Great Britain | Apr. 9, 1958 |